US012802688B2

(12) United States Patent
Kukde et al.

(10) Patent No.: US 12,802,688 B2
(45) Date of Patent: Nov. 17, 2026

(54) SYSTEM AND METHOD FOR REARRANGING CONFERENCE RECORDINGS

(71) Applicant: RingCentral, Inc., Belmont, CA (US)

(72) Inventors: Prashant Kukde, Milpitas, CA (US); Vlad Vendrow, Reno, NV (US); Alexey Sviridov, Saint-Petersburg (RU)

(73) Assignee: RingCentral, Inc., Belmont, CA (US)

( * ) Notice: Subject to any disclaimer, the term of this patent is extended or adjusted under 35 U.S.C. 154(b) by 376 days.

(21) Appl. No.: 17/847,028

(22) Filed: Jun. 22, 2022

(65) Prior Publication Data

US 2023/0260516 A1 Aug. 17, 2023

(51) Int. Cl.
*G10L 15/26* (2006.01)
*H04L 12/18* (2006.01)

(52) U.S. Cl.
CPC .......... *G10L 15/26* (2013.01); *H04L 12/1831* (2013.01)

(58) Field of Classification Search
CPC ............................ G10L 15/26; H04L 12/1831
See application file for complete search history.

(56) References Cited

U.S. PATENT DOCUMENTS

| | | | | |
|---|---|---|---|---|
| 11,488,634 | B1 * | 11/2022 | Decrop | G11B 27/031 |
| 2015/0106091 | A1 * | 4/2015 | Wetjen | G10L 15/26 704/235 |
| 2016/0073054 | A1 * | 3/2016 | Balasaygun | H04L 12/1822 348/14.08 |
| 2019/0138266 | A1 * | 5/2019 | Takechi | G06F 16/5866 |
| 2021/0367801 | A1 * | 11/2021 | Rajamani | G10L 15/22 |
| 2022/0293087 | A1 * | 9/2022 | Kumar | G10L 15/02 |
| 2022/0407900 | A1 * | 12/2022 | Gawande | G06F 40/10 |
| 2023/0154456 | A1 * | 5/2023 | Bassani | G06F 40/166 704/200 |

* cited by examiner

*Primary Examiner* — Bhavesh M Mehta
*Assistant Examiner* — Edward Tracy, Jr.

(57) ABSTRACT

A computer-implemented method for recording, comprising: transcribing a content of a conference session using a conferencing system, determining a topic from the content of the conference session, determining a timestamp for the topic from the content using the conferencing system, determining a snippet from the content, assigning the snippet to the topic and rearranging the snippet based on the topic and the timestamp within the conferencing system.

19 Claims, 6 Drawing Sheets

SYSTEM AND METHOD FOR REARRANGING CONFERENCE RECORDINGS

RELATED APPLICATIONS

This application is a Non-Provisional U.S. Application and claims the benefit and priority to the PCT Application PCT/RU2022/000041 that was filed on Feb. 16, 2022, and which is incorporated herein by reference in its entirety.

TECHNICAL FIELD

The present disclosure relates generally to the field of conference call recording. Specifically, the present disclosure relates to systems and methods for rearranging conference call snippets based on an associated topic.

BACKGROUND

Conference calls have gained significant popularity during last several years as a communication tool, and beyond that, as a business collaboration tool with the rise of a global pandemic and the increased need for remote work.

Important or useful audio or video conference calls can be recorded for future replay by participants or other users, but the current technology level offers only linear conference call recording that starts at the beginning of the conference call when a participant turns it on and ends when the participants turn the recording off.

SUMMARY

The appended claims may serve as a summary of the invention.

DETAILED DESCRIPTION

Figure 1:
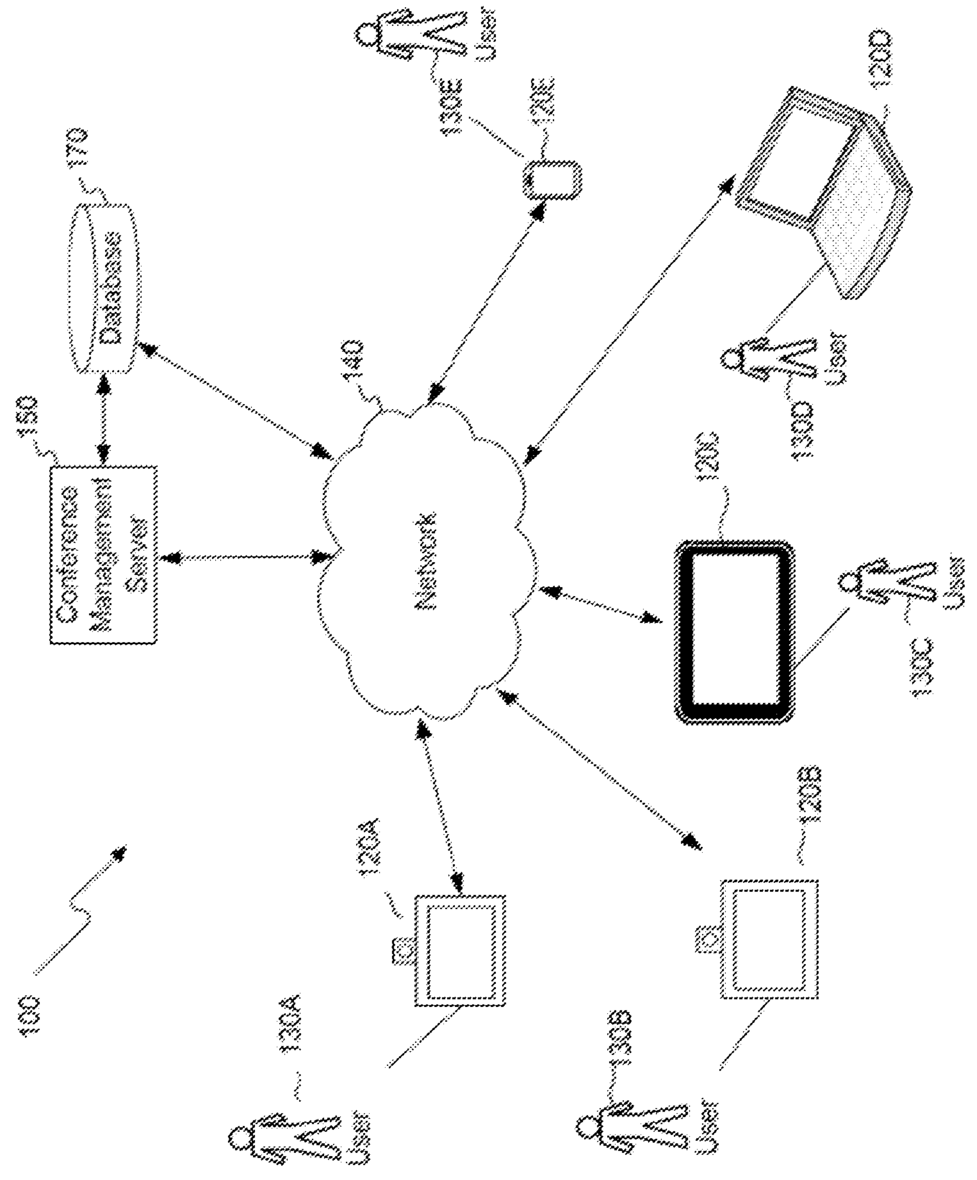
FIG. 1 is a diagram of a communication system, in accordance with some embodiments of the present disclosure.

Before various example embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying", "contacting", "gathering", "accessing", "utilizing", "resolving", "applying", "displaying", "requesting", "monitoring", "changing", "updating", "establishing", "initiating", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

A "computer" is one or more physical computers, virtual computers, and/or computing devices. As an example, a computer can be one or more server computers, cloud-based computers, cloud-based cluster of computers, virtual machine instances or virtual machine computing elements such as virtual processors, storage and memory, data centers, storage devices, desktop computers, laptop computers, mobile devices, Internet of Things (IoT) devices such as home appliances, physical devices, vehicles, and industrial equipment, computer network devices such as gateways, modems, routers, access points, switches, hubs, firewalls, and/or any other special-purpose computing devices. Any reference to "a computer" herein means one or more computers, unless expressly stated otherwise.

The "instructions" are executable instructions and comprise one or more executable files or programs that have been compiled or otherwise built based upon source code prepared in JAVA, C++, OBJECTIVE-C or any other suitable programming environment.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Computer storage media can include volatile and non-volatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, solid state drives, hard drives, hybrid drive, or any other medium that can be used to store the desired information and that can be accessed to retrieve that information.

It is appreciated that present systems and methods can be implemented in a variety of architectures and configurations. For example, present systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

It should be understood, that terms "user" and "participant" have equal meaning in the following description.

A term conference session means, without limitation, two or more people communication using audio and/or video communication means through any type of user device or virtual reality techniques, any type of webinar or any type of podcast or any type of recorded video/audio stream.

In one embodiment, a computer-implemented method for recording comprises transcribing a content of a conference session using a conference system, determining a topic from the content of the conference session, determining a timestamp for the topic from the content using the conference system, determining a snippet from the content, assigning the snippet from the content to the topic, and rearranging the snippet based on the topic and the timestamp within the conference system.

In another embodiment, a system for recording comprises a memory storing a set of instructions and at least one processor configured to execute the instructions to: transcribe a content of a conference session using a conference system, determine a topic from the content of the conference session, determine a timestamp for the topic from the content using the conference system, determine a snippet from the content, assign the snippet from the content to the topic, and rearrange the snippet based on the topic and the timestamp within the conference system.

In yet another embodiment, a web-based server for recording comprises a memory storing a set of instructions, and at least one processor configured to execute the instructions to: transcribe a content of a conference session using a conference system, determine a topic from the content of the conference session, determine a timestamp for the topic from the content using the conference system, determine a snippet from the content, assign the snippet from the content to the topic, and rearrange the snippet based on the topic and the timestamp within the conference system.

Turning now to FIG. 1 that shows an example of a conference management system 100 in which various implementations as described herein may be practiced. Conference management system 100 enables a plurality of users to schedule conferences, run conferences and record conferences. In some examples, one or more components of conference management system 100, such as conference management server 150, can be used to implement computer programs, applications, methods, processes, or other software to perform the described techniques and to realize the structures described herein.

As shown in FIG. 1, conference management system 100 includes one or more user devices 120A-120E (collectively, referred to as user devices 120), a network 140, a conference management server 150, and a database 170. The components and arrangements shown in FIG. 1 are not intended to limit the disclosed embodiments, as the system components used to implement the disclosed processes and features can vary.

The network 140 facilitates communications and sharing of conference content and media between user devices 120 (some or all) and the conference management server 150. The network 140 may be any type of network that provides communications, exchanges information, and/or facilitates the exchange of information between the conference management server 150 and user devices 120. For example, the network 140 may be the Internet, a Local Area Network, a cellular network, a public switched telephone network ("PSTN"), or other suitable connection(s) that enables conference management system 100 to send and receive information between the components of conference management system 100. A network may support a variety of electronic messaging formats and may further support a variety of services and applications for user devices 120.

The conference management server 150 can be a computer-based system including computer system components, desktop computers, workstations, tablets, hand-held computing devices, memory devices, and/or internal network(s) connecting the components. The conference management server 150 may be configured to provide conference services, such as setting up conference sessions for users 130A-130E. The conference management server 150 may be configured to receive information from user devices 120 over the network 140, process the information, store the information, manipulate the information and/or transmit conference information to the user devices 120 over the network 140. For example, the conference management server 150 may be configured to analyze images, video signals, and audio signals sent by users 130A-130E, record those signals as a conference session, and rearrange snippets of the conference session into a rearranged conference session recording. The conference management server 150 may store the rearranged conference session recording and send the rearranged recording to user devices 120A-120E, based on their requests, or store it in database 170. The rearranged conference recording comprises snippets of the conference associated with determined topics. A determined topic may be discussed during different parts of the conference session with intervals for other intervening topics. The rearranged conference recording has determined topics that are played to a user in sequential order based on timestamps and content of the conference.

In some implementations, the functionality of the conference management server 150 described in the present disclosure is distributed among one or more of the user devices 120A-120E. For example, one or more of the user devices 120A-120E may perform functions such as recording the conference, determining the topics of the conference and rearranging snippets based on determined topics and timestamps.

The database 170 includes one or more physical or virtual storages coupled with the conference management server 150. The database 170 is configured to store conference information received from user devices 120, profiles of the users 130 such as contact information and images of the users 130, recording of the conference, information about determined topics and timestamps for the determined topics. The database 170 may further include images, audio signals, and video signals received from the user devices 120. The data stored in the database 170 may be transmitted to the conference management server 150 for analysis and generation of the rearranged conference recording. In some embodiments, the database 170 is stored in a cloud-based server (not shown) that is accessible by the conference management server 150 and/or the user devices 120 through the network 140. While the database 170 is illustrated as an external device connected to the conference management server 150, the database 170 may also reside within the conference management server 150 as an internal component of the conference management server 150.

As shown in FIG. 1, users 130A-130E may communicate with conference management server 150 using various types of user devices 120A-120E via network 140. As an example, user devices 120A, 120B, and 120D include a display such as a television, tablet, computer monitor, video conferencing console, or laptop computer screen. User devices 120A, 120B, and 120D may also include video/audio input devices such as a video camera, web camera, or the like. As another example, user devices 120C and 120E include mobile devices such as a tablet or a smartphone having display and video/audio capture capabilities. User devices 120A-120E may also include one or more software applications that facilitate the user devices to engage in communications, such as IM, text messages, EMAIL, VoIP, video conferences, with one another.

Figure 2:
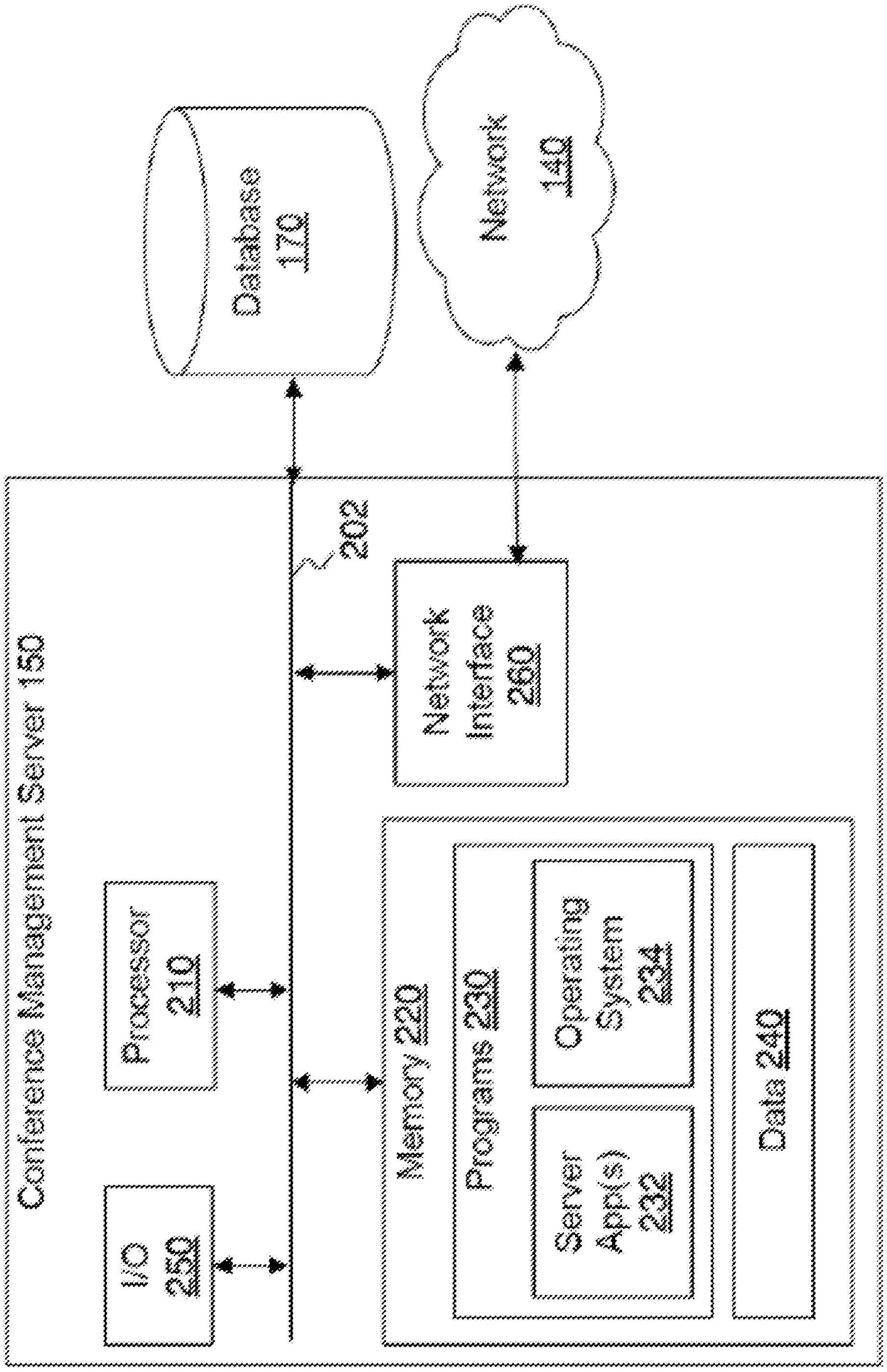
FIG. 2 is a diagram of a server, in accordance with some embodiments of the present disclosure.

FIG. 2 shows a diagram of an example conference management server 150, consistent with the disclosed embodiments. The conference management server 150 includes a bus 202 (or other communication mechanism) which interconnects subsystems or components for transferring information within the conference management server 150. As shown, the conference management server 150 includes one or more processors 210, input/output ("I/O") devices 250, network interface 260 (e.g., a modem, Ethernet card, or any other interface configured to exchange data with the network 140), and one or more memories 220 storing programs 230 including, for example, server app(s) 232, operating system 234, and data 240, and can communicate with an external database 170 (which, for some embodiments, may be included within the conference management server 150). The conference management server 150 may be a single server or may be configured as a distributed computer system including multiple servers, server farms, clouds, or computers that interoperate to perform one or more of the processes and functionalities associated with the disclosed embodiments.

The processor 210 may be one or more processing devices configured to perform functions of the disclosed methods, such as a microprocessor manufactured by Intel™ or manufactured by AMD™. The processor 210 may comprise a single core or multiple core processors executing parallel processes simultaneously. For example, the processor 210 may be a single core processor configured with virtual processing technologies. In certain embodiments, the processor 210 may use logical processors to simultaneously execute and control multiple processes. The processor 210 may implement virtual machine technologies, or other technologies to provide the ability to execute, control, run, manipulate, store, etc. multiple software processes, applications, programs, etc. In some embodiments, the processor 210 may include a multiple-core processor arrangement (e.g., dual, quad core, etc.) configured to provide parallel processing functionalities to allow the conference management server 150 to execute multiple processes simultaneously. It is appreciated that other types of processor arrangements could be implemented that provide for the capabilities disclosed herein.

The memory 220 may be a volatile or non-volatile, magnetic, semiconductor, tape, optical, removable, non-removable, or other type of storage device or tangible or non-transitory computer-readable medium that stores one or more program(s) 230 such as server apps 232 and operating system 234, and data 240. Common forms of non-transitory media include, for example, a flash drive a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

The conference management server 150 may include one or more storage devices configured to store information used by processor 210 (or other components) to perform certain functions related to the disclosed embodiments. For example, the conference management server 150 may include memory 220 that includes instructions to enable the processor 210 to execute one or more applications, such as server apps 232, operating system 234, and any other type of application or software known to be available on computer systems. Alternatively or additionally, the instructions, application programs, etc. may be stored in an external database 170 (which can also be internal to the conference management server 150) or external storage communicatively coupled with the conference management server 150 (not shown), such as one or more database or memory accessible over the network 140.

The database 170 or other external storage may be a volatile or non-volatile, magnetic, semiconductor, tape, optical, removable, non-removable, or other type of storage device or tangible or non-transitory computer-readable medium. The memory 220 and database 170 may include one or more memory devices that store data and instructions used to perform one or more features of the disclosed embodiments. The memory 220 and database 170 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

In some embodiments, the conference management server 150 may be communicatively connected to one or more remote memory devices (e.g., remote databases (not shown)) through network 140 or a different network. The remote memory devices can be configured to store information that the conference management server 150 can access and/or manage. By way of example, the remote memory devices could be document management systems, Microsoft SQL database, SharePoint databases, Oracle™ databases, Sybase™ databases, or other relational databases. Systems and methods consistent with disclosed embodiments, however, are not limited to separate databases or even to the use of a database.

The programs 230 include one or more software modules configured to cause processor 210 to perform one or more functions consistent with the disclosed embodiments. Moreover, the processor 210 may execute one or more programs located remotely from one or more components of the conference management system 100. For example, the conference management server 150 may access one or more remote programs that, when executed, perform functions related to disclosed embodiments.

In the presently described embodiment, server app(s) 232 causes the processor 210 to perform one or more functions of the disclosed methods. For example, the server app(s) 232 cause the processor 210 to receive conference content during a conference session, such as audio, video or shared content sent by one or more users, obtain conference context of the conference session, record the conference session and rearrange snippets based on determined topics. In some embodiments, other components of the conference management system 100 may be configured to perform one or more functions of the disclosed methods. For example, user devices 120A-120E may be configured to record the conference session and rearrange snippets based on determined topics.

In some embodiments, the program(s) 230 may include the operating system 234 performing operating system functions when executed by one or more processors such as the processor 210. By way of example, the operating system 234 may include Microsoft Windows™, Unix™, Linux™, Apple™ operating systems, Personal Digital Assistant (PDA) type operating systems, such as Apple iOS, Google Android, Blackberry OS, or other types of operating systems. Accordingly, disclosed embodiments may operate and function with computer systems running any type of operating system 234. The conference management server 150 may also include software that, when executed by a processor, provides communications with the network 140 through the network interface 260 and/or a direct connection to one or more user devices 120A-120E.

In some embodiments, the data 240 may include, conference audio, video and shared content received from user devices 120. Data 240 may further include conference context. For example, data 240 may comprise the conference session recording and a transcription of the conference session recording. Further, data 240 may include data used for analyzing and determining topics of the conference, such as key words, phrases, shared content or Machine Learning (ML) training data.

The conference management server 150 may also include one or more I/O devices 250 having one or more interfaces for receiving signals or input from devices and providing signals or output to one or more devices that allow data to be received and/or transmitted by the conference management server 150. For example, the conference management server 150 may include interface components for interfacing with one or more input devices, such as one or more keyboards, mouse devices, and the like, that enable the conference management server 150 to receive input from an operator or administrator (not shown).

Figure 3:
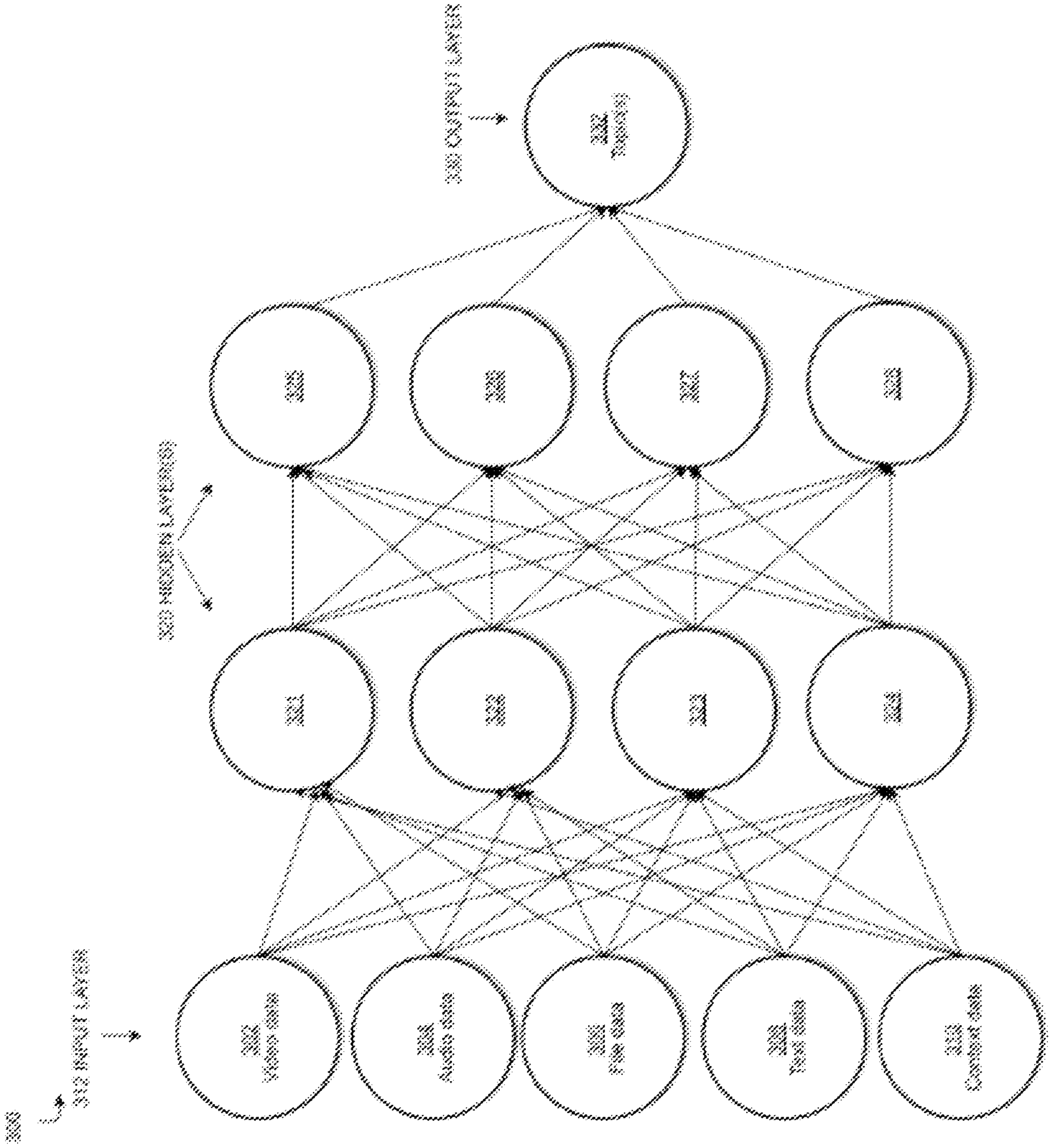
FIG. 3 is a diagram of Machine Learning technique in accordance with some embodiments of the present disclosure.

In an embodiment, machine learning may be used to train the conference server 150 to determine topics of the conference. Referring to FIG. 3, a neural network 300 may utilize an input layer 312, one or more hidden layers 320, and an output layer 330 to train a machine learning algorithm or model to detect topics of the conference session, such as a topic discussed during certain period of the conference. In some embodiments, where topics are labeled, supervised learning is used such that known input data, a weighted matrix, and know output data is used to gradually adjust the model to accurately compute the already known output. In other embodiments, where topics are not labeled, unstructured learning is used such that a model attempts to reconstruct known input data over time in order to learn.

Training of the neural network 300 using one or more training input matrices, a weight matrix and one or more known outputs is initiated by one or more computers associated with the conference server 150. For example, the conference server 150 may be trained by one or more training computers and, once trained, used in association with the user devices 120. In an embodiment, a computing device may run known input data through a deep neural network 300 in an attempt to compute a particular known output. For example, a server computing device uses a first training input matrix and a default weight matrix to compute an output. If the output of the deep neural network does not match the corresponding known output of the first training input matrix, the server adjusts the weight matrix, such as by using stochastic gradient descent, to slowly adjust the weight matrix over time. The server computing device then re-computes another output from the deep neural network with the input training matrix and the adjusted weight matrix. This process continues until the computer output matches the corresponding known output. The server computing device then repeats this process for each training input dataset until a fully trained model is generated.

In the example of FIG. 3, the input layer 312 includes a plurality of training datasets that are stored as a plurality of training input matrices in an associated database, such as database 170 of FIG. 1. The training input data includes, for example, video data 302, audio data 304, file data 306, text data 308 and context data 310. Video data 302 is input data related to any video related media from the conference like traditional video feed, 3D visualization, augmented reality, etc. Audio data 304 is input data related to any audio related conference media data like audio feed. File data 306 relates to any types of files attached to the conference session, a conference session invitation or shared during the conference session by any participant using video feed or the conference session integrated chat functionality, if any, and includes presentation, images, videos and other possible pieces of information that one participant can share with at least one another participant during the conference session. Text data 308 includes all text data from any participant typed during the conference session using an integrated chat functionality of the conference session or using third party messengers not related to the conference session. In some embodiments, text data may be converted from other types of data obtained during the conference session. For example text data may be obtained as a result of speech to text transcription of the audio data 304 or as a result of optical character recognition (OCR) of the file data 306. Context data 310 is data associated with the conference, such as a subject of the conference session, agenda of the conference session, scheduled time of the conference session, list of the participants of the conference session, etc. While the example of FIG. 3 uses a single neural network, in some embodiments, separate neural networks 300 would be trained to identify topics from each of the different types of input data. For example, one neural network 300 would be trained to identify topics strictly from video data, another neural network 300 would be trained to identify topics from the audio data, another neural network 300 would be trained to identify topics from the file data, and so forth. Any number of neural networks, in any combination, may be used to train the conference management server 150 to identify topics.

In the embodiment of FIG. 3, hidden layers 320 represent various computational nodes 321, 322, 323, 324, 325, 326, 327, 328. The lines between each node 321, 322, 323, 324, 325, 326, 327, 328 represent weighted relationships based on the weight matrix. As discussed above, the weight of each line is adjusted overtime as the model is trained. While the embodiment of FIG. 3 features two hidden layers 320, the number of hidden layers is not intended to be limiting. For example, one hidden layer, three hidden layers, ten hidden layers, or any other number of hidden layers may be used for a standard or deep neural network. The example of FIG. 3 also features an output layer 330 with topic(s) 332 as the known output. The topic(s) 332 indicate one or more topics that were discussed during the conference session. As discussed above, in this structured model, the topics 332 are used as a target output for continuously adjusting the weighted relationships of the model. When the model successfully outputs the topics 332, then the model has been trained and may be used to process live or field data.

Once the neural network 300 of FIG. 3 is trained, the trained conference management server 150 will accept field data at the input layer 312, such as the video data 302, audio data 304, file data 306, text data 308 and/or context data 310. In some embodiments, the field data is live data that is accumulated in real time, such as a live streaming video and audio of the conference session. In other embodiments, the field data may be current data that has been saved in an associated database, such as database 170. The trained conference management server 150 is applied to the field data in order to identify one or more topics at the output layer 330. For instance, a trained conference management system 150 can identify a subset of topics during the conference session. In some embodiments the topics of the conference session may be used on the input layer 312 to determine possible subtopics of the topics on the output layer 330.

Figure 4:
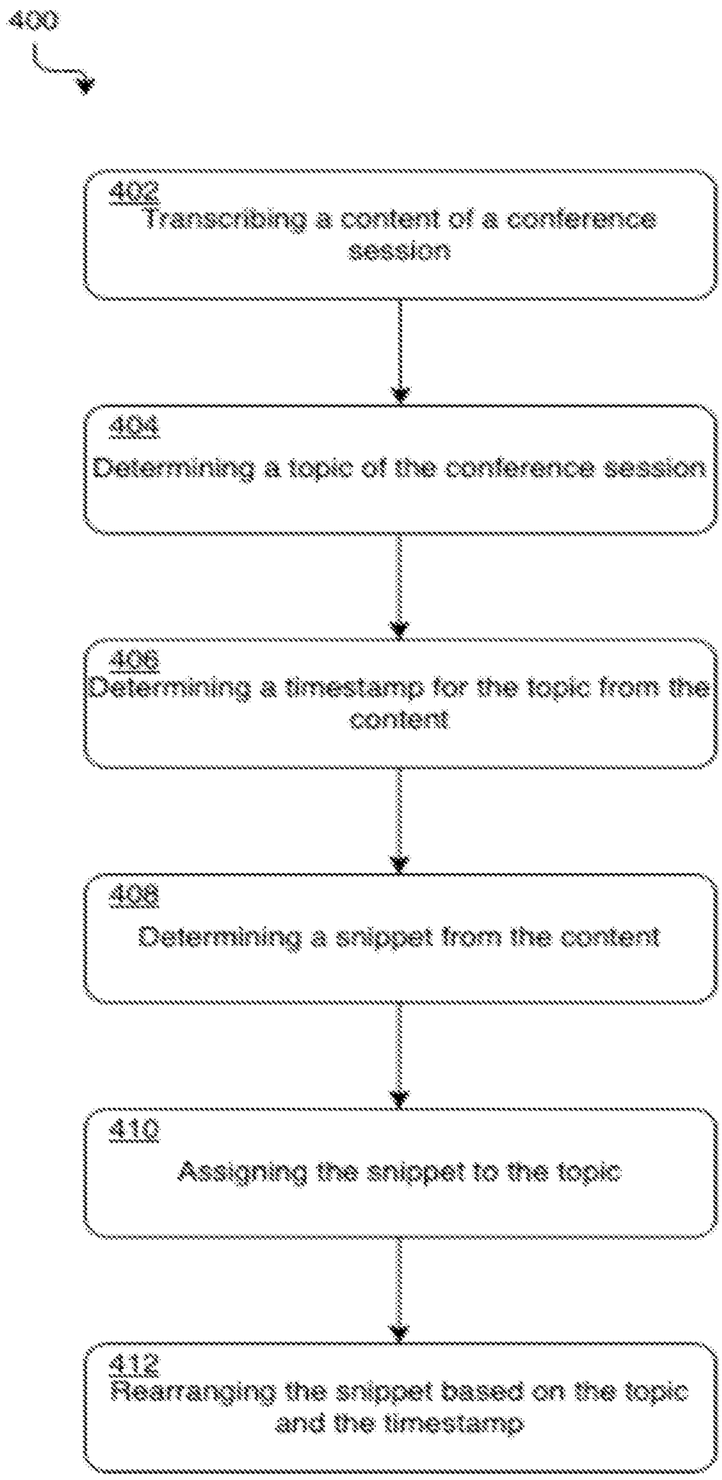
FIG. 4 is a flow chart of a method for rearranging a recording of a conference session, in accordance with some embodiments of the present disclosure.

Referring now to FIG. 4, FIG. 4 depicts a flow chart of a method for rearranging snippets of a conference session. At step 402, a content of the conference session is transcribed. All audio inputs from participants are transcribed to text. Different known techniques can be used for the transcription. The transcription can be made for real-time content, for example the conference management server 150 can do on-the-fly or real-time transcription of the conference session and store transcribed text to the database 170. In another embodiment the transcription can be done to a recorded conference session. The database 170 stores the recorded conference session and the conference management server 150 transcribes it, the transcription can be stored in the database 170 and associated with the conference session. In another embodiment, not only are the contents of the conference session transcribed, but the conference shared content that includes any data the is (was) shared during the conference session are also transcribed.

At step 404, a topic of the conference session is determined. Different techniques can be used for determination. As an example, embodiments the conference management server 150 parses the transcription from the step 402 and obtains a subset of key words or key phrases from the transcription. Key words or key phrases are divided by their meaning and belonging to similar area that can be identified as a topic. Every group of the key words or key phrases is assigned with a topic that these key words or key phrases belong to. Additionally, the conference management server 150 can use, for example, file data 306 and/or context data 310 to collect key words or key phrases that participants shared with each other or other non-participants when discussing the conference session. Different optical character recognition (OCR) techniques can be used to parse any files or data shared during the conference and extract words and phrases. In another embodiment the conference management server 150 can use a conference context to determine the topic of the conference session. The conference context can include a conference session subject, a conference session participant, a conference session scheduled time, etc. The conference management server 150, using this additional data, can divide key words and key phrases to topics more accurately. For example, the conference session that has a subject "IP session" and participants who are from the Legal Department will help tie the topic to or identify it as an "Intellectual Property (IP)" topic, while a conference session with the same subject but with participants from the Engineering Department will be tied the topic of "Network Issues related to an Internet Protocol (IP)".

In another example embodiment, machine learning (ML) can be used to determine the topic of the conference session, using, for example, the ML model described in FIG. 3. The video data 302, audio data 304, file data 306, text data 308 and/or context data 310, alone or in combination can be used as input to ML model to determine the topic of the conference session.

In yet another embodiment, determination of the topic of the conference session occurs through several rounds, where a first round determines a topic, a second round determines a subtopic of the topic, and so forth. The number of rounds can be set by a user, participant or administrator of the conference session or can be set automatically by the ML algorithm.

At step 406, a timestamp is determined for the topic. When the conference management server 150 completes determination of the topic it determines when the topic started during the conference session. For example, the conference management server 150 determines when the subset of the key words or the key phrases started to arrive in the conference session, or based on the ML model result for the topic determination, the conference management server 150 assigns the timestamp to the topic. The conference management server 150 associates a timestamp with the topic and stores it in the database 170. It should be understood that more than a single timestamp can be associated with the topic. The topic can be discussed more than one time during the conference session and more than one timestamps should be associated with the topic determined at the step 404. In one example, the conference management server 150 determined at the step 404 that the conference session had three topics: Topic 1, Topic 2 and Topic 3. At the step 406, the conference management server 150 determined that Topic 1 arrived during the conference session at timestamp T1 and timestamp T3, Topic 2 arrived at timestamp T2 and T5, and Topic 3 arrived at timestamp T4.

In another embodiment a timestamp for the subtopic can be determined, similarly to the topic determined and stored in the database 170 along with the timestamp for that topic.

At step 408, determining of a snippet from the content of the conference session occurs. A snippet means a part of a recording of the conference session between two sequential timestamps. The conference management server 150 based on stored timestamps determines any number of the snippets in the conference session and creates the snippets from the recording of the conference session. In the example above, the conference management server 150, at step 406, determined that a Topic 1 has timestamps T1 and T3, Topic 2 has timestamps T2 and T5, and Topic 3 has a timestamp T4. In this case, the conference management server 150 determines five snippets: Snippet 1 starting at T1 and ending at T2, Snippet 2 starting at T2 and ending at T3, Snippet 3 starting at T3 and ending at T4, Snippet 4 starting at T4 and ending at T5, and Snippet 5 starting at T5 and ending with the end of the conference session. The snippets of the conference session can be stored in the database 170 along with the conference session.

At step 410, the conference management server 150 assigns the snippet to the topic based on determined timestamps for the topic at step 406. The snippets that belong to the same topic may be located in different parts of the recording of the conference in accordance with associated timestamps. In the example above, Snippets 1-5 were associated with Timestamps 1-5, respectively, at the step 408, and Topics 1-3 were associated with Timestamps 1-5 at step 406. At the present state, based on the Timestamps 1-5, Snippet 1 is assigned to Topic 1, Snippet 2 is assigned to Topic 2, Snippet 3 is assigned to Topic 1, Snippet 4 is assigned to Topic 3, and Snippet 5 is assigned to Topic 2.

At step 412, the conference management server 150 rearranges the snippets based on the topic. When rearranged, all the snippets associated with a particular topic are composed together in sequential order based on the timestamps associated with the snippets. Rearranged conference snippets are stored in the database 170. In one example, the conference session had taken place between several participants and it was recorded and stored in the database 170. As described above at step 402, the conference management server 150 transcribes the conference session recording, determines the topics at step 404, determines the timestamp for the topic at step 406, determines the snippet at step 408, assigns the snippet to the topic at step 410. At the present step, the conference management server 150 determines that the snippets assigned to Topic 1 are not sequential but have a break for the Topic 2 discussion. To improve user experience and compose the conference session recording in such a way that all topics are ordered sequentially, the conference management server 150 moves Snippet 3 to where Snippet 2 had been so that Topic 1, which was discussed during Snippet 1 and Snippet 3, is replayed in the conference session recording without interruptions. Similarly, Snippet 4 is exchanged with the Snippet 5 because Snippet 5 should follow Snippet 2 in sequence, as both were assigned to Topic 2.

In another embodiment, the conference management server 150 can rearrange the order of the snippets assigned to a single topic, in case the content of the snippet with the later timestamp should logically be placed before the snippet with the earlier timestamp. In one example scenario, in Snippet 1, the participants discussed a problem and made a decision to address the problem, while in the Snippet 3 the participants discussed reasons why the problem arose. In this scenario, the content of Snippet 3 should logically be placed before the content of Snippet 1. The sequential logic can be determined by the conference management server 150 using ML model, for example, as discussed above.

Figure 5A:
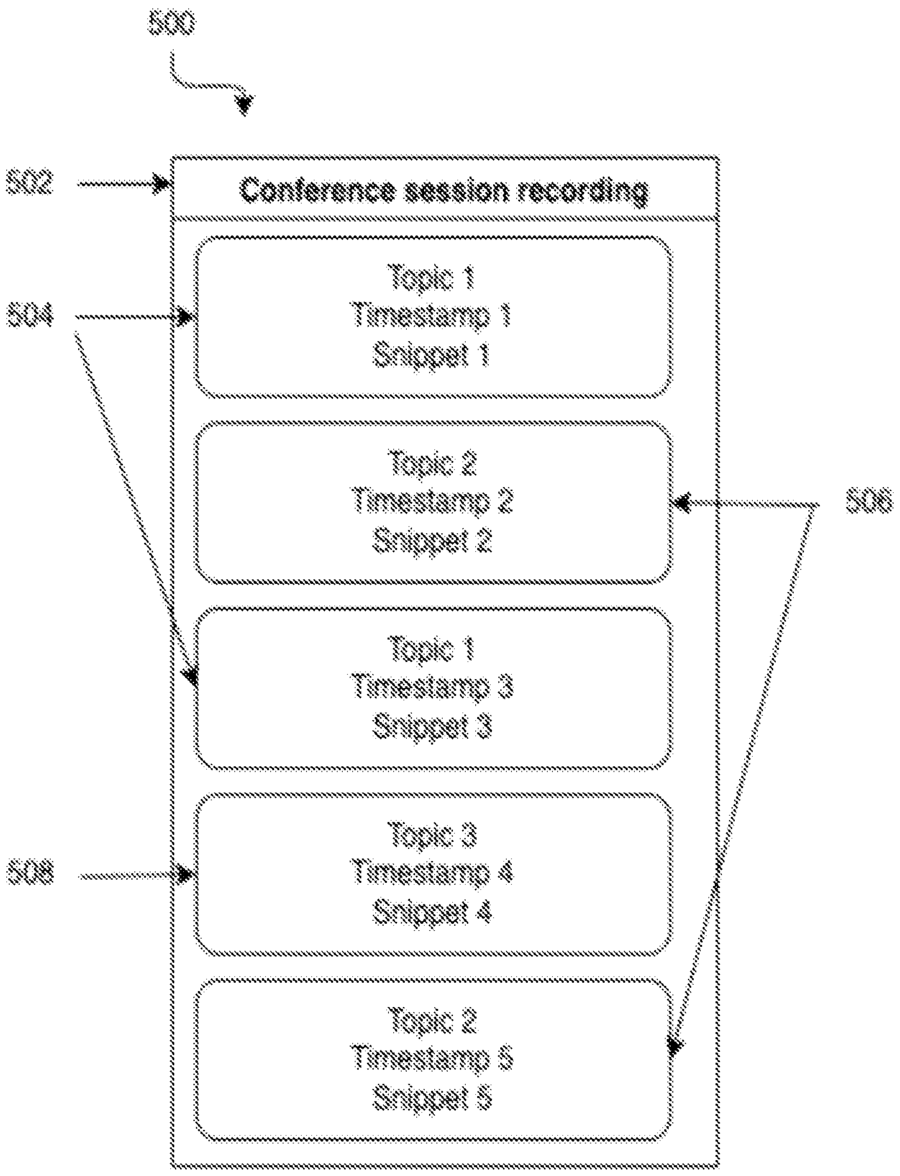
FIGS. 5A and 5B are diagrams of methods for rearranging a recording of a conference session, in accordance with some embodiments of the present disclosure.

Now referring to FIG. 5A, the conference management server 150 has a structure of the conference session recording 502 that comprises five snippets where snippets 504 are associated with Topic 1, snippets 506 are associated with Topic 2 and snippets 508 are associated with Topic 3. The snippets associated with the same topic are not sequential in the conference session recording. This means that the meeting participants first discussed Topic 1, then discussed Topic 2, but then returned to Topic 1 to discuss some additional details. Following the additional discussion of Topic 1, participants switched to Topic 3, and at the end of the conference session, they returned to Topic 2. In this example, the conference management server 150, using a trained ML algorithm or key word or key phrase techniques correctly determined the topics and timestamps for the topics and assigned the snippets to the associated topic.

At step 410, snippets that are associated with the same topic are not arranged in sequential order and are locate in different parts of the conference session recording.

As discussed above, the conference management server 150 rearranges the snippets at step 412.

Figure 5B:
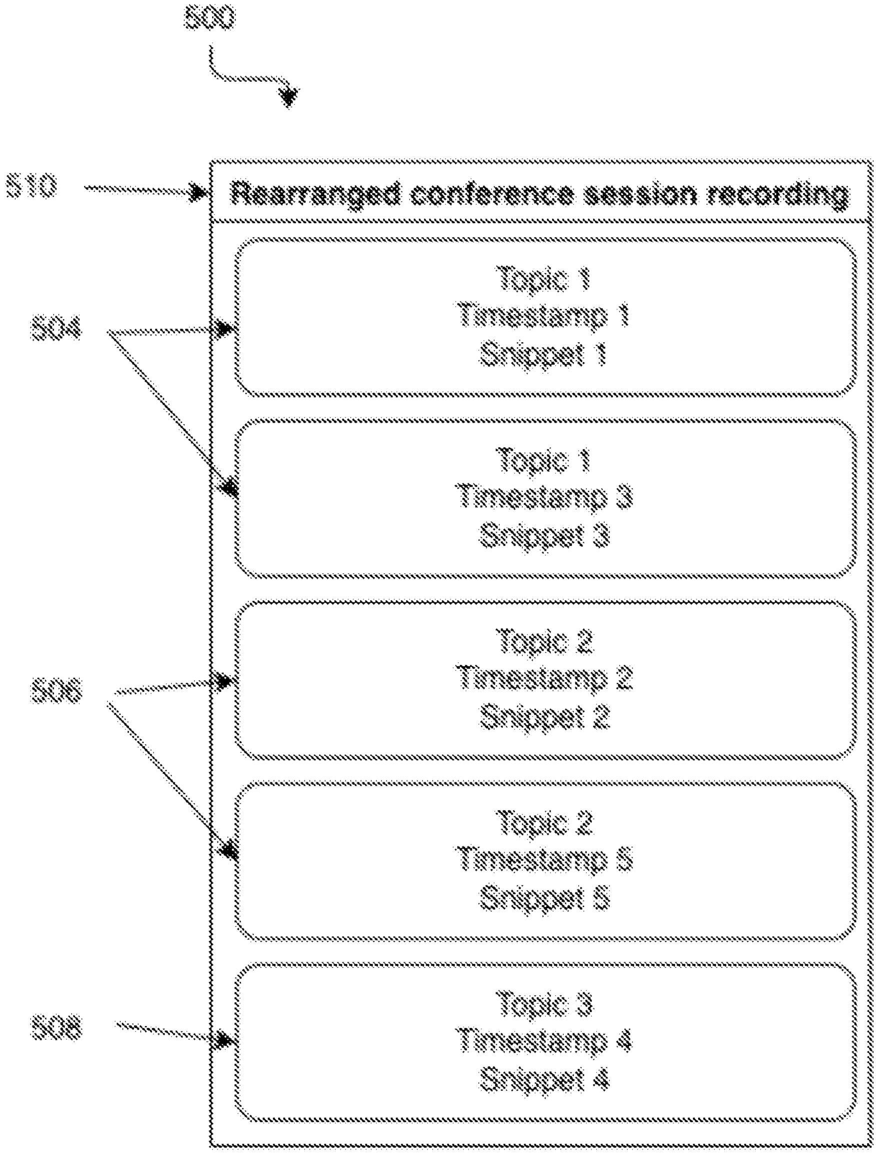

Now referring to FIG. 5B, after execution of the step 412, the conference management server 150 has generated a rearranged conference session recording 510 where snippets 504 associated with Topic 1 follow one another sequentially. Similarly, snippets 506 and snippet 508 associated with the Topic 2 and the Topic 3 respectively. Rearranged conference session recording 510 allows users who watch it to follow a discussion about a single topic even if in real conference session it was discussed during different part of the conference session.

In another embodiment, the rearranged conference session recording 510 can replay topics based on the importance of the topic and its association with the conference session. For example, the conference management server 150, based on the conference context and/or on the conference shared content, can determine that Topic 2 is a main topic for the particular conference session, even when Topic 1 was discussed before Topic 2. In this case, the conference management server 150 can rearrange the recording of the conference session such that Topic 2 is replayed first, with Topic 1 and Topic 3 following in succession.

In some embodiments, a topic can comprise subtopics that can be rearranged within the topic. Any level of topic divide can be applied to the conference session recording. The level of topic divide can be set manually by participants, users or administrators of the video conference session or can be set automatically by the conference management server 150.

In another embodiment, the conference management server 150 can use additional information to determine topics from the conference session recording. For example, the file data 306 including any content that a participant shares with any other participant during the conference session or the conference content that may include a subject of the conference session, an agenda of the conference session a participant information, the text data 308 or the context data 310.

In yet another embodiment, the conference management server 150 can determine a main topic of the conference session based on the file data 306, the text data 308 and/or the context data 310 and rearrange the snippets to place the main topic to the beginning of the rearranged conference session recording 510.

In another embodiment the conference management server 150 can assign weights based on relevance between the determined topics and the conference session's core discussion, which can be determined based on the text data, the file data and the context data. Weights might be a numeric data in a range from 1 to 5 where 1 is assigned to the least relevant topic and 5 is assigned to the most relevant topic, for example. The conference management server 150 can assign the weights to determined topics of the conference session and rearrange the conference session recording based on topic weights where the most relevant topics with the higher or highest weights are played at the beginning, while less relevant topics with lower or lowest weights are played after the most relevant topics. In other embodiments, weights may be assigned to each snippet within a particular topic. For example, a weight of 1 may be assigned to the least relevant snippet for a particular topic while 5 is assigned to the most relevant snippet of that same topic. Once assigned, the conference management server 150 may rearrange the snippets within the same topic based on the weights such that the most relevant snippets for that topic are play first while the least relevant snippets for that topic are played last.

In anther embodiment the conference management server 150 can use timestamps and weights assigned to the topics to arrange a playback to the user. For example, for topics that have been assigned the same weight, the conference management server 150 checks the timestamp to determine the order in which to rearrange and play the topics, with earlier timestamped topics preceding later timestamped topics. In some embodiments, the timestamps are used to rearrange snippets of a particular topic. For example, if snippets within a particular topic have been assigned the same relevance weight, the conference management server 150 may use the timestamp of the snippets to determine the order in which the snippets should be rearranged and played, with earlier timestamped snippets preceding later timestamped snippets.

In another embodiment the conference management server 150 can track a series of conference sessions and apply the rearranging of snippets not only for a particular conference session recording, but for the entire series. For example, the conference management server 150 may add snippets from a particular conference session recording to a conference session recording of the series of the conference session.

In yet another embodiment, the conference server 150 can rearrange the snippets only for a single topic chosen by a user and replay these snippets in sequential order even if the topic was discussed in different parts of the conference session. The conference server 150 can represent a list of determined topics to the user and obtain the user input in case only specific topics are of the user's interest.

In some embodiments, the conference server 150 stores the rearranged sequential snippets as a single audio file, video file, and/or any other file such that a user may select the option to play the entire conference session in the rearranged sequential order. In other embodiments, the system may label all the snippets by topic, and upon a user's request to play the topic, the system automatically jumps to and plays all the snippets by topic in sequential order without the need to store all the snippets in the rearranged order.

The series of the conference sessions can be determined by the conference management server 150 based on manual input from any participant, user or administrator of the conference session, or automatically based on similarity in the topics or additional information like text data, file data or context data.

What is claimed is:

1. A computer-implemented method for recording, comprising:

transcribing a first and a second content from a first and a second electronic conference session, respectively, using a conferencing system, into a text format and storing the transcribed first and second content into a database;

determining a first topic and a second topic associated with the first content of the first electronic conference session based on the transcribed first content;

determining the first topic associated with the second content of the second electronic conference session based on the transcribed second content;

determining a first plurality of timestamps from the first content using the conferencing system, wherein the first plurality of timestamps is associated with the first and the second topics;

assigning the first plurality of timestamps to the first and the second topics of the first content, and storing the association between the first plurality of timestamps and the first and the second topics of the first content in the database;

determining a first plurality of snippets from the first content, wherein each snippet of the first plurality of snippets corresponds to a portion of the first electronic conference session between two subsequent timestamps of the first plurality of timestamps;

assigning each snippet of the first plurality of snippets to the first topic or the second topic based on the first plurality of timestamps;

determining a second plurality of snippets from the second content, wherein each snippet of the second plurality of snippets corresponds to a portion of the second electronic conference session between two subsequent timestamps of a second plurality of timestamps, wherein each timestamp of the second plurality of timestamps is associated with a topic, and wherein a particular snippet of the second plurality of snippets is associated with the first topic;

rearranging chronological ordering of snippets of the first plurality of snippets and the second plurality of snippets based on the first topic and the second topic to form a modified plurality of snippets, wherein the modified plurality of snippets includes snippets ordered in a first subset of snippets associated with the first topic and a second subset of snippets associated with the second topic, wherein the first subset of snippets contains snippets associated with the first topic from the first electronic conference session and the particular snippet of the second plurality of snippets associated with the first topic from the second electronic conference session, and wherein the second subset of snippets contains snippets associated with the second topic from either the first electronic conference session and the second electronic conference session;

storing the modified plurality of snippets as an electronic file; and rendering snippets associated with the first topic from the electronic file in response to user selection of the first topic and rendering snippets associated with the second topic from the electronic file in response to user selection of the second topic.

2. The method of claim 1, wherein determining the first topic comprises determining a subtopic.

3. The method of claim 1, wherein determining the first topic is based on Machine Learning (ML) techniques or keywords or tag cloud.

4. The method of claim 1 wherein determining the first topic includes assigning a weight of the topic.

5. The method of claim 4, wherein assigning the weight is based on a relevance of the first topic to the first content.

6. The method of claim 4, wherein assigning the weight is based on a type of the conference session.

7. The method of claim 1, wherein the rearranging chronological ordering of snippets of the plurality of snippets based on the first topic is based on a user selection of the first topic.

8. A system for recording, comprising:

a memory storing a set of instructions; and at least one processor configured to execute the instructions to:

transcribe a first and a second content from a first and a second electronic conference session, respectively, using a conferencing system, into a text format and storing the transcribed first and second content into a database;

determine a first topic and a second topic associated with the first content of the first electronic conference session based on the transcribed first content;

determine the first topic associated with the second content of the second electronic conference session based on the transcribed second content;

determine a first plurality of timestamps from the first content using the conferencing system, wherein the first plurality of timestamps is associated with the first and the second topics;

assign the first plurality of timestamps to the first and the second topics of the first content, and storing the association between the first plurality of timestamps and the first and the second topics of the first content in the database;

determine a first plurality of snippets from the first content, wherein each snippet of the first plurality of snippets corresponds to a portion of the first electronic conference session between two subsequent timestamps of the first plurality of timestamps;

assign each snippet of the first plurality of snippets to the first topic or the second topic based on the first plurality of timestamps;

determine a second plurality of snippets from the second content, wherein each snippet of the second plurality of snippets corresponds to a portion of the second electronic conference session between two subsequent timestamps of a second plurality of timestamps, wherein each timestamp of the second plurality of timestamps is associated with a topic, and wherein a particular snippet of the second plurality of snippets is associated with the first topic;

rearrange chronological ordering of snippets of the first plurality of snippets and the second plurality of snippets based on the first topic and the second topic to form a modified plurality of snippets, wherein the modified plurality of snippets includes snippets ordered in a first subset of snippets associated with the first topic and a second subset of snippets associated with the second topic, wherein the first subset of snippets contains snippets associated with the first topic from the first electronic conference session and the particular snippet of the second plurality of snippets associated with the first topic from the second electronic conference session, and wherein the second subset of snippets contains snippets associated with the second topic from either the first electronic conference session and the second electronic conference session;

store the modified plurality of snippets as an electronic file; and render snippets associated with the first topic from the electronic file in response to user selection of the first topic and rendering snippets associated with the second topic from the electronic file in response to user selection of the second topic.

9. The system of claim 8, wherein determining the first topic comprises determining a subtopic.

10. The system of claim 8, wherein determining the first topic is based on Machine Learning (ML) techniques or keywords or tag cloud.

11. The system of claim 8, wherein determining the first topic includes assigning a weight of the topic.

12. The system of claim 11, wherein assigning the weight is based on a relevance of the first topic to the first content.

13. The system of claim 11, wherein assigning the weight is based on a type of the conference session.

14. A web-based server for recording, comprising:

a memory storing a set of instructions; and at least one processor configured to execute the instructions to:

transcribe a first and a second content from a first and a second electronic conference session, respectively, using a conferencing system, into a text format and storing the transcribed first and second content into a database;

determine a first topic and a second topic associated with the first content of the first electronic conference session based on the transcribed first content;

determine the first topic associated with the second content of the second electronic conference session based on the transcribed second content;

determine a first plurality of timestamps from the first content using the conferencing system, wherein the first plurality of timestamps is associated with the first and the second topics, assign the first plurality of timestamps to the first and the second topics of the first content, and storing the association between the first plurality of timestamps and the first and the second topics of the first content in the database;

determine a first plurality of snippets from the first content, wherein each snippet of the first plurality of snippets corresponds to a portion of the first electronic conference session between two subsequent timestamps of the first plurality of timestamps, assign each snippet of the first plurality of snippets to the first topic or the second topic based on the first plurality of timestamps;

determine a second plurality of snippets from the second content, wherein each snippet of the second plurality of snippets corresponds to a portion of the second electronic conference session between two subsequent timestamps of a second plurality of timestamps, wherein each timestamp of the second plurality of timestamps is associated with a topic, and wherein a particular snippet of the second plurality of snippets is associated with the first topic;

rearrange chronological ordering of snippets of the first plurality of snippets and the second plurality of snippets based on the first topic and the second topic to form a modified plurality of snippets, wherein the modified plurality of snippets includes snippets ordered in a first subset of snippets associated with the first topic and a second subset of snippets associated with the second topic, wherein the first subset of snippets contains snippets associated with the first topic from the first electronic conference session and the particular snippet of the second plurality of snippets associated with the first topic from the second electronic conference session, and wherein the second subset of snippets contains snippets associated with the second topic from either the first electronic conference session and the second electronic conference session;

store the modified plurality of snippets as an electronic file; and render snippets associated with the first topic from the electronic file in response to user selection of the first topic and rendering snippets associated with the second topic from the electronic file in response to user selection of the second topic.

15. The web-based server of claim 14, wherein determining the first topic comprises determining a subtopic.

16. The web-based server of claim 14, wherein determining the first topic is based on Machine Learning (ML) techniques or keywords or tag cloud.

17. The web-based server of claim 14, wherein determining the first topic includes assigning a weight of the first topic.

18. The web-based server of claim 17, wherein assigning the weight is based on a relevance of the first topic to the first content.

19. The web-based server of claim 17, wherein assigning the weight is based on a type of the conference session.

* * * * *